Nov. 18, 1924.

A. J. KERCHER 1,515,684

THERMOSTATIC CONTROLLER

Filed March 26, 1923  2 Sheets-Sheet 1

WITNESS:
H. Sherburne

INVENTOR
Arthur J. Kercher
BY White Prost & Evans
his ATTORNEYS.

Nov. 18, 1924.
A. J. KERCHER
1,515,684
THERMOSTATIC CONTROLLER
Filed March 26, 1923   2 Sheets-Sheet 2
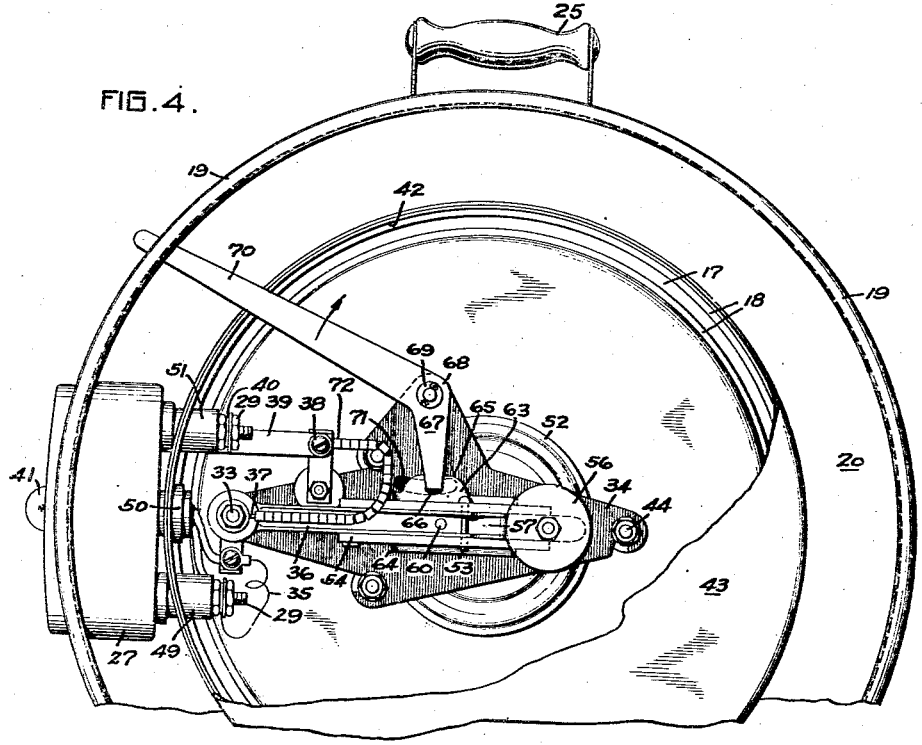
FIG.4.
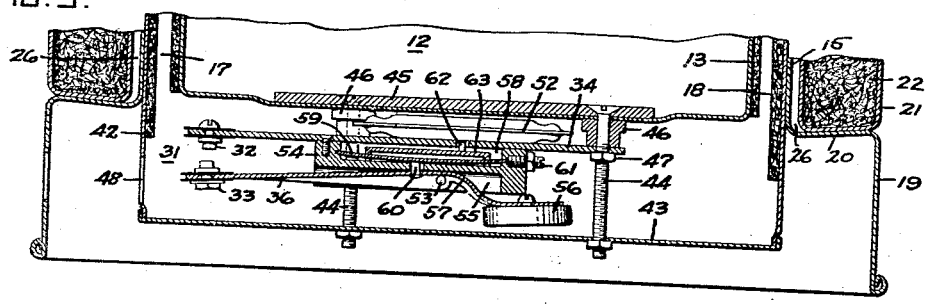
FIG.5.
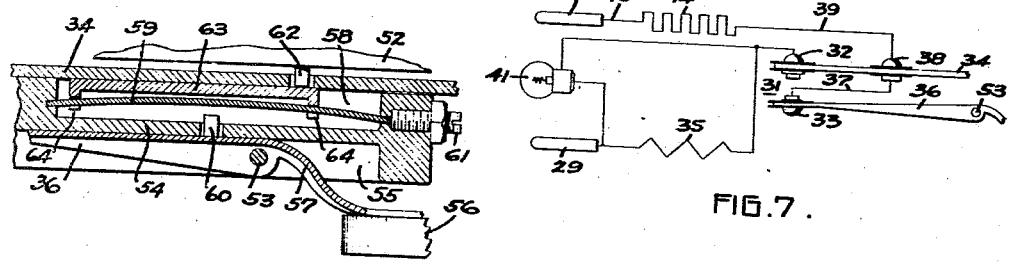
FIG.6.
FIG.7.
WITNESS:
H. Sherburne
INVENTOR
Arthur J. Kercher
BY White ___ ___
his ATTORNEYS.

Patented Nov. 18, 1924.

1,515,684

UNITED STATES PATENT OFFICE.

ARTHUR J. KERCHER, OF BERKELEY, CALIFORNIA.

THERMOSTATIC CONTROLLER.

Application filed March 26, 1923. Serial No. 627,661.

*To all whom it may concern:*

Be it known that I, ARTHUR J. KERCHER, a citizen of the United States, and a resident of the city of Berkeley, in the county of Alameda and State of California, have invented a new and useful Thermostatic Controller, of which the following is a specification.

This invention relates to a temperature responsive controller, and more particularly to one which it is possible to adjust so as to vary its point of response with respect to the temperature. Such a device is especially useful in connection with heating appliances, for controlling the heating elements, and I shall describe it as used on an electrical cooker, where it serves to maintain the cooking temperature at any value that is variable within limits.

It is one of the objects of my invention to provide a thermal controller that is simple and inexpensive. Another object is to provide a controller of this type that may readily and quickly be adjusted to perform its function. Still another object is to improve in general the construction and operation of this type of mechanism.

Still another object is to make it possible, in a thermostat utilizing a readily volatilizable liquid in a closed cell, to vary the temperature at which the controlling function is effected.

My invention possesses other advantageous features, some of which with the foregoing, will be set forth at length in the following description, where I shall outline in full that form of the invention which I have selected for illustration in the drawings accompanying and forming part of my present specification. Although I have shown in the drawings but one embodiment of my invention, it is to be understood that I do not desire to be limited thereto, since the invention as expressed in the claims may be embodied in other forms also.

Referring to the drawings:

Figure 4 is an enlarged fragmentary view taken from the bottom of the cooker;

Figure 5 is an enlarged fragmentary sectional view similar to Fig. 3, but showing the thermostat switch in open position;

Figure 6 is an enlarged sectional view showing how the thermostat may be adjusted for varying the cooking temperature; and Figure 7 is a diagram of connections for the cooker.

Figure 1:
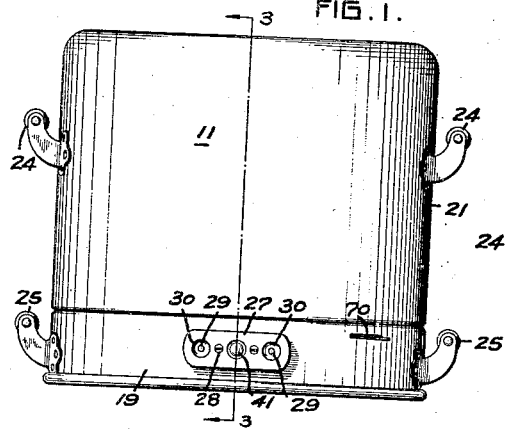
Figure 1 is a side elevation of a cooker equipped with a thermal controller constructed in accordance with my invention, and illustrates one adaptation of my device.
Figure 2:
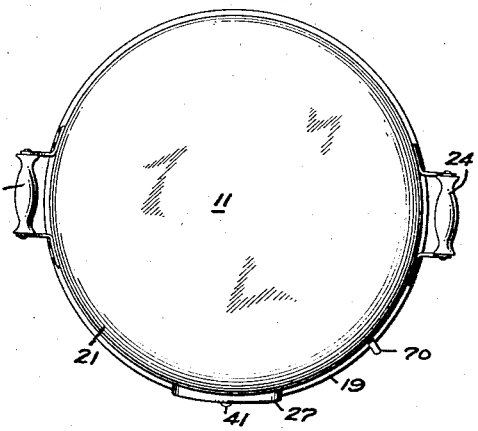
Figure 2 is a top plan view of the cooker shown in Fig. 1.

The cooker 11 is in the present instance in the form of a cyindrical body, and includes a cooking chamber 12 formed within a container or vessel 13. This vessel is preferably made from sheet metal such as copper or aluminum, and is of any convenient size. The food to be cooked is first disposed in a pot or pan, that is adapted to be accommodated within the chamber 12. In order to supply this chamber with heat for cooking, one or more electric heating elements 14 are disposed in good heat conducting relation with the vessel 13, and these elements in the present instance are shown in the form of bands or rings encircling the vessel 13, and located thereon so as to heat the chamber 12 evenly.

In order to enclose and conceal the heating elements 14, as well as to provide heat insulation for it and the vessel 13, an encompassing wall 15 is disposed about this vessel. There is thus formed a double walled structure, between the double walls of which is accommodated the heating elements 14. This wall 15 is appropriately fastened near its top to the open end of the vessel 13, as by the seaming 16. Although in the present instance the space 17 formed between the walls is shown as not completely filled with heat insulating material, such an arrangement may be used if desired, in lieu of the sheets of insulating material 18 shown in Fig. 3. The wall 15 is extended to form a base 19 within which the control elements for the device may be accomodated. The top of base 19 also forms an annular rim 20 around the bottom of wall 15, which rim serves as a rest or support for the cover 21. This cover is double walled as indicated, and telescopes over the chamber 12. Between the double walls, insulating material 22 is packed. Furthermore the telescoping is purposely made loose, knobs or projections 23 being provided on the exterior of wall 15 to space the cover therefrom. The surfaces of contact on rim 20 and the bottom of cover 22 are purposely sloped towards the center, so that the tendency for the cover to become misalined is reduced. Handles such as 24 and 25 may be fastened to the exterior of the base 19 and the cover 21 for facilitating manual transportation as well as manipulation of cover 22.

The structure of the cooker as thus outlined is described in greater detail and claimed in a divisional application entitled "Electric cooker", filed in my name on Sept. 29, 1923, and having Serial No. 665,703.

The supply of electric current to the heating elements is effected by the aid of a connection block 27 held on the base 19. In the present instance this block is shown as made up of two parts which are disposed one on the inside and the other on the outside of the base, and clamped together, as by the aid of screws 28 passing through the base. This connection block has a pair of contact posts 29 which are below the surface of the block and located in bores 30 therein. Into these bores, appropriately formed plugs may be inserted to contact with the posts 29.

As shown most clearly in the diagram of connections, the circuit for the heating elements 14 which connects to the posts 29, is controlled by a switch 31 having relatively movable contacts 32 and 33. The stationary contact 32 is insulated from and supported by a metallic plate 34, and connects, as by the aid of a lead 35, to the lower post 29. The movable contact may be supported on a lever 36; a short lead 37, insulated by beads 72, connects this contact with another stationary insulated contact post 38; to which one lead 39 of the heating elements 14 is connected. The other lead 40 from these elements connects directly with the upper post 29. With the switch closed as in Fig. 1, and posts 29 connected to an external source, the elements 14 are active, their circuit being completed as follows:— from lower post 29, lead 35, stationary contact 32, movable contact 33, lead 37, post 38, lead 39, heating elements 14, to upper post 29. In order to indicate whether the heating elements are active or not, I provide a small pilot light 41 disposed in a socket 42 in the block 27 which is connected in parallel to the lead 35. This lead is purposely made of sufficiently high resistance so as to provide a large enough drop in potential to light the lamp when current is being supplied.

The switch 31, with its associated parts, is located below the chamber 13 and is concealed by a tubular extension 42 projecting from the bottom of the wall 15, and a cover 43 for this extension. This cover 43 is held in place by aid of a plurality of screws or studs 44, which pass through the bottom of chamber 12 and a reinforcing plate 45 disposed therein. These studs may also conveniently serve to support the plate 34 rigidly, as for example by the aid of bushings 46 disposed thereon and nuts 47 engaging the studs. Furthermore the extension 42 is apertured at one side, as indicated at 48, Fig. 5, for accommodating the insulation bushings 49, 50 and 51 which are used to lead the connections from the block 27 to the space defined by the extension 42 and its cover 43.

Figure 3:
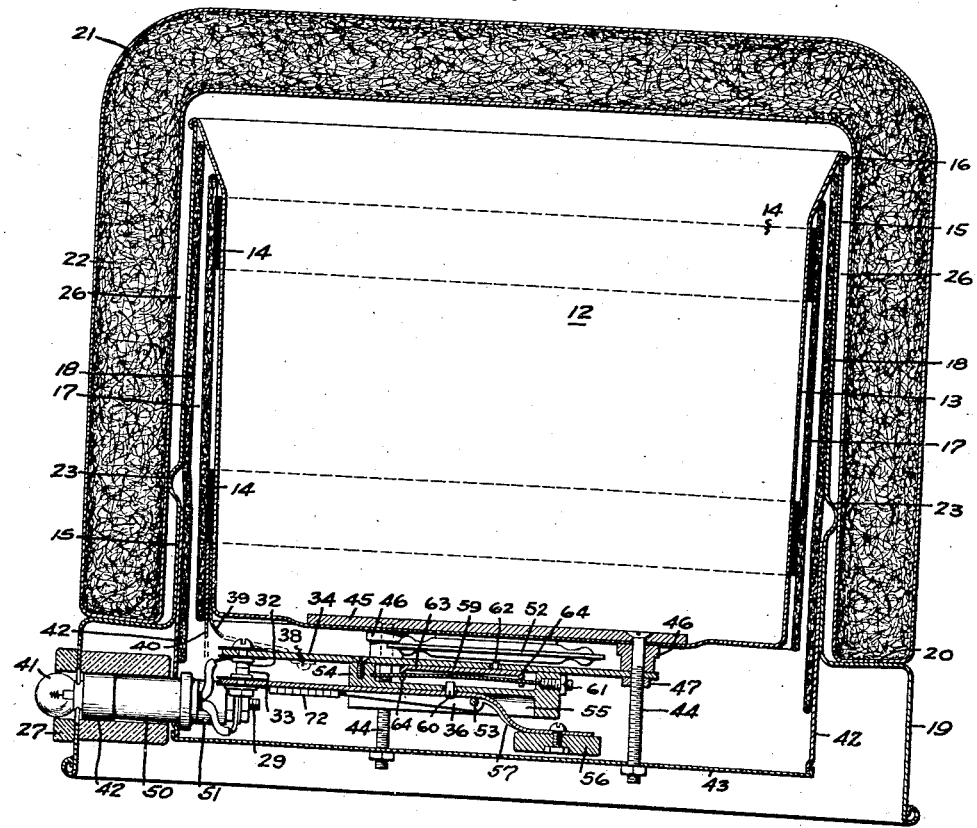
Figure 3 is an enlarged sectional view taken along the plane 3—3 of Fig. 1, showing the thermostat switch in closed position.

In order to guard against undesirable or dangerous temperatures in the cooking chamber 12, a thermostat controller embodying my invention, is arranged to open the switch upon the attainment of a definite temperature therein. When the switch opens, the heating elements 14 are deenergized, and remain so until the temperature recedes to a lower value. Upon this occurring, the switch is permitted to close again. The cycle of operations may then be repeated many times until some other agency causes the circuit to be finally interrupted somewhere externally of the cooker itself, as for example by withdrawal of the plugs from the posts 29. The thermostat is arranged so that it is acted upon by the temperature developed in chamber 12, and not to any material extent by the temperature developed immediately adjacent the heating elements. It is evident that in this way the actual cooking temperature may be controlled to a nicety. To accomplish this result, the thermostat is arranged in close heat conducting relation with the bottom of chamber 12. I prefer to employ a thermostat utilizing a readily volatilizable fluid in an enclosed chamber, such as defined by the cell 52. This cell is placed adjacent the bottom of the chamber 12, so that it may be in as good thermal conductive relation with the cooking food as practicable. The cell 52 has resilient metal disc faces such as spring copper, which may be expanded or forced out by the pressure exerted in the cell due to the volatilization of the liquid therein. The cell 52 is held in place against the bottom of the chamber 12 by soldering. Expansion of the cell to a sufficient degree causes the contact 33 to move away from the stationary contact 32 and to open the heating element circuit. Fig. 3 shows the cell 52 in a condition when it has not expanded sufficiently to operate the movable contact 33, while Fig. 5 shows the cell expanded sufficiently to move the contact 33.

The mechanical connections whereby the expansions and contractions of the cell 52 operate the switch contact 33 will now be described. The movable switch lever 36 is pivoted on a pin 53 which is carried by a stationary support 54, fastened to the bottom of plate 34. This support 54 may be grooved, as at 55, in order to accommodate the lever 36. Furthermore this lever is biased yieldingly to closed position, and for this purpose a counterweight 56 is fastened to an arm 57 of the lever 36. I prefer to provide, as one of the elements in the mechanical connection from the pressure cell 52 to the switch arm 36, a buckled leaf spring 59; this spring 59 is arranged so that it may press against a projection or pin 60 fastened to the lever 36 and extending into a space 58 formed in the support 54 adjacent the plate 34. This space may also be conveniently used for accommodating the spring 59, the ends of which are shown as anchored in the end walls of the space. The buckling of the spring is so adjusted that its stable position corresponds to that shown in Fig. 3, or Fig. 6, where it is arched away from the pin 60, and thus permits the switch contacts to remain closed. The buckling of the spring so that its arch coacts with the pin 60 to urge contact 33 away from the stationary contact 32 is unstable, and it can be held in this position only by the force exerted on the spring 59 by the expanding cell 52. In order to adjust the buckling of the spring, a set screw 61 is provided for exerting a force against one end of the spring 59, as by threading into an appropriate aperture in the support 54.

The expansion of cell 52, if sufficiently great, effects the buckling of spring 59 so that it may be sprung to the position of Fig. 5, and since this buckling is in the nature of a snap action, the contacts open quickly. Conversely, upon a slight contraction of the cell 52, the spring returns to its stable position of Fig. 3, and permits the contacts to close.

Although any of several different kinds of mechanical connections may be employed between the cell 52 and the spring 59 to effect this result, I prefer to make this connection adjustable, so as to vary the leverage of the force exerted by the expanding cell. In this way the temperature at which the thermostat operates may be controlled. For this purpose, there is interposed between a projection or pin 62 of the cell 52, and the spring 59, an adjustable slide 63. This slide has a pair of feet 64 resting on the spring, and a back cooperating with pin 62 of cell 52. The feet 64 are separated by an appreciable distance, so that they each are adjacent respectively to the anchored ends of spring 59. One of the feet, such as 64 is much closer to the pin 62, and serves to transmit substantially all of the force to the spring which is exerted by the cell 52. By moving the slide 63 so as to bring this right hand foot 64 nearer the pin 62, the force exerted by this foot on the spring 59 approaches that exerted by cell 52, and at the same time, the lever arm of this force is also increased, since it is measured from the right hand anchored end of spring 59 to the point of application of the force. Fig. 6 illustrates this position, which corresponds to a low temperature adjustment, since less force need be exerted by the cell 52 to exert a large enough torque on the spring for urging it to the position of Fig. 5. The left hand foot 64 is provided merely for supporting the slide 63; the force exerted thereby on the spring is of no substantial value since it is always at a considerable distance from the pin 62. Furthermore due to the large flexure of spring 59, the force exerted by the right hand foot has influence in turning the spring only about its right hand anchored end, and no appreciable influence as regards the left hand end. In an analogous manner, the left hand foot, which is as before stated used merely for supporting the slide 63, has no appreciable effect in assisting the torque exerted by the right hand foot about the right hand end of the spring 59.

By referring to Fig. 4, one manner in which the slide 63 may be adjusted, is indicated. The slide has an extension 65 in which there is an aperture 66. Into this aperture the end of the arm 67 of a pivoted lever 68 is turned. This lever is pivoted on a pin 69 held on the stationary plate 34. It is evident that by rotating this lever, the slide 63 may be adjusted. The arm 70 serves as a convenient means for effecting this result, and for ease in manipulation, this arm extends through appropriate slots in the extension 42 and base 19 so that it is accessible from the outside of the cooker. I prefer to provide an arcuate guide 71 cut in the plate 34 for accommodating the end of arm 67 so that this end may project a considerable distance through the extension 65 of slide 63.

I claim:

1. In a thermostat, a member movable in response to temperature variations, a buckled spring, a mechanical connection between the member and spring, whereby upon sufficient movement of the member, the spring may be sprung over, and means for setting the mechanical connection so as to determine the point of application of the force exerted by the member on the spring, whereby the temperature at which the spring operates may be controlled.

2. In a thermostat, a member movable in response to temperature variations, a buckled spring arranged to be sprung over on a predetermined movement of the member, and means for varying the temperature at which the spring is operated, comprising a variable mechanical connection between the member and the spring for varying the leverage of the force exerted by the member on the spring.

3. In a thermostat, a buckled spring having a stable arched position and an opposite unstable arched position, a member movable in response to temperature variations for controlling the buckling of the spring, and means for varying the effect of the member on the spring.

4. In a thermostat, a buckled spring having a stable arched position and an opposite unstable arched position, a circuit controller operated by the movement of the spring, a member movable in response to temperature variations for controlling the buckling of the spring, and means for varying the effect of the member on the spring.

5. In a thermostat, a pressure cell expansible in response to temperature variations, a buckled spring adapted to be sprung over on a predetermined expansion of said cell, and means whereby the force of expansion of the cell necessary to operate the spring may be varied, comprising a member adapted to contact with the spring at an adjustable point of contact.

6. In a thermostat, a buckled spring having a stable arched position and an unstable arched position, a pressure cell expansible in response to temperature variations for controlling the buckling of the spring, and means whereby the force of expansion of the cell necessary to operate the spring may be varied.

7. In a thermostat, a buckled spring having a stable arched position and an opposite unstable arched position, a circuit controller operated by the movement of the spring, a pressure cell expansible in response to temperature variations for controlling the buckling of the spring, and means whereby the force of expansion of the cell necessary to operate the spring may be varied.

8. In a thermostat, a buckled spring adapted to be sprung over, a member for transmitting a force to the spring adjustable so that the point of application of the force to the spring may be varied, and a temperature responsive element operating the member mechanically and supplying the force for buckling the spring.

9. In a thermostat, a buckled spring having a stable arched position and an opposite unstable arched position, a member for transmitting a force to the spring adjustable so that the point of application of the force may be varied, and a temperature responsive element operating the member mechanically and supplying the force for buckling the spring.

10. In a thermostat, a buckled spring having a stable arched position and an opposite unstable arched position, a circuit controller operated by the buckling of the spring, a member for transmitting a force to the spring adjustable so that the point of application of the force may be varied, and a temperature responsive element operating the member mechanically and supplying the force for buckling the spring.

11. In a thermostat, a buckled spring adapted to be sprung over and thereby perform a controlling function, and means for operating the spring in response to temperature conditions comprising a slide adjustably mounted on the spring, whereby it has an adjustable place of contact therewith, and a temperature responsive element adapted to exert a force against said slide.

12. In a thermostat, a buckled spring having a stable arched position and an opposite unstable arched position, an electric switch operated by the movement of the spring from one position to another, a support in which the ends of the spring are anchored, a slide having two feet contacting with the spring respectively near the points where they are anchored, a lever having an arm for adjusting the slide on the spring, and an expansible pressure cell arranged to transmit a force due to its expansion to the slide at a point relatively nearer to one of the feet than the other.

13. In a thermostat, a member movable in response to temperature variations, a device arranged to be operated by the force exerted by the movable member, and means for varying the temperature at which said device is operated, comprising a lever arm, and means operated by said arm to vary the leverage of the force exerted by the movable member on the device.

14. In a thermostat, a closed pressure cell expansible in response to temperature rise, a device arranged to be mechanically operated by the force of expansion of the cell, and means for varying the temperature at which said device is operated, comprising a lever arm, and means operated by said arm to vary the leverage of the force exerted by the cell on the device.

15. In a thermostat, a member movable in response to temperature variations, a buckled spring arranged to be sprung over by the force exerted by the movable member, and means for varying the temperature at which said spring is sprung over, comprising a lever arm, and means operated by said arm to vary the leverage of the force exerted by the movable member on the spring.

16. In a thermostat, a closed pressure cell expansible in response to temperature rise, a buckled spring arranged to be sprung over by the force of expansion of the cell, and means for varying the temperature at which said spring is sprung over, comprising a lever arm, and means operated by said arm to vary the leverage of the force exerted by the cell on the spring.

In testimony whereof, I have hereunto set my hand.

ARTHUR J. KERCHER.